UNITED STATES PATENT OFFICE.

FREDERICK L. SANDOZ, OF OPELOUSAS, LOUISIANA.

FLYTRAP.

1,369,357.  Specification of Letters Patent.  Patented Feb. 22, 1921.

Application filed June 15, 1920. Serial No. 389,107.

*To all whom it may concern:*

Be it known that I, FREDERICK L. SANDOZ, a citizen of the United States of America, and resident of Opelousas, in the parish of St. Landry and State of Louisiana, have invented certain new and useful Improvements in Flytraps, of which the following is a specification.

This invention relates to fly traps and an object of the invention is to provide novel means whereby flies are attracted to a rotatable member, the said device having novel means for dislodging the flies and causing them to ascend to a trap.

A further object of this invention is to produce a device of this character which will operate or act as a lure without scaring the insects or causing them apprehension prior to their being dislodged and trapped.

A still further object of this invention is to produce a fly trap which can be readily disassembled for the purpose of removing the catch or restoring the liquid or other poison which is to be used for destroying the insects.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
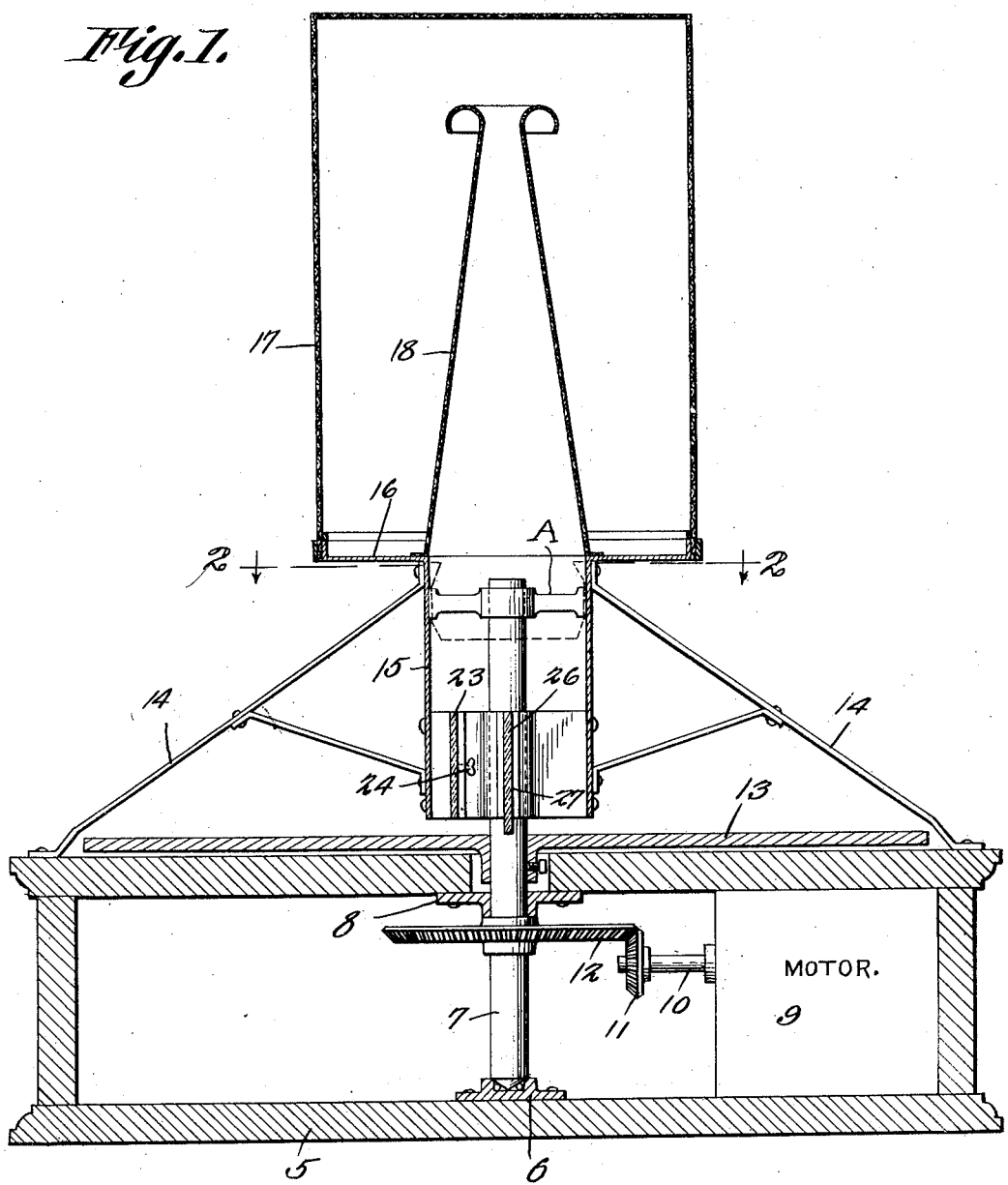
Figure 2:
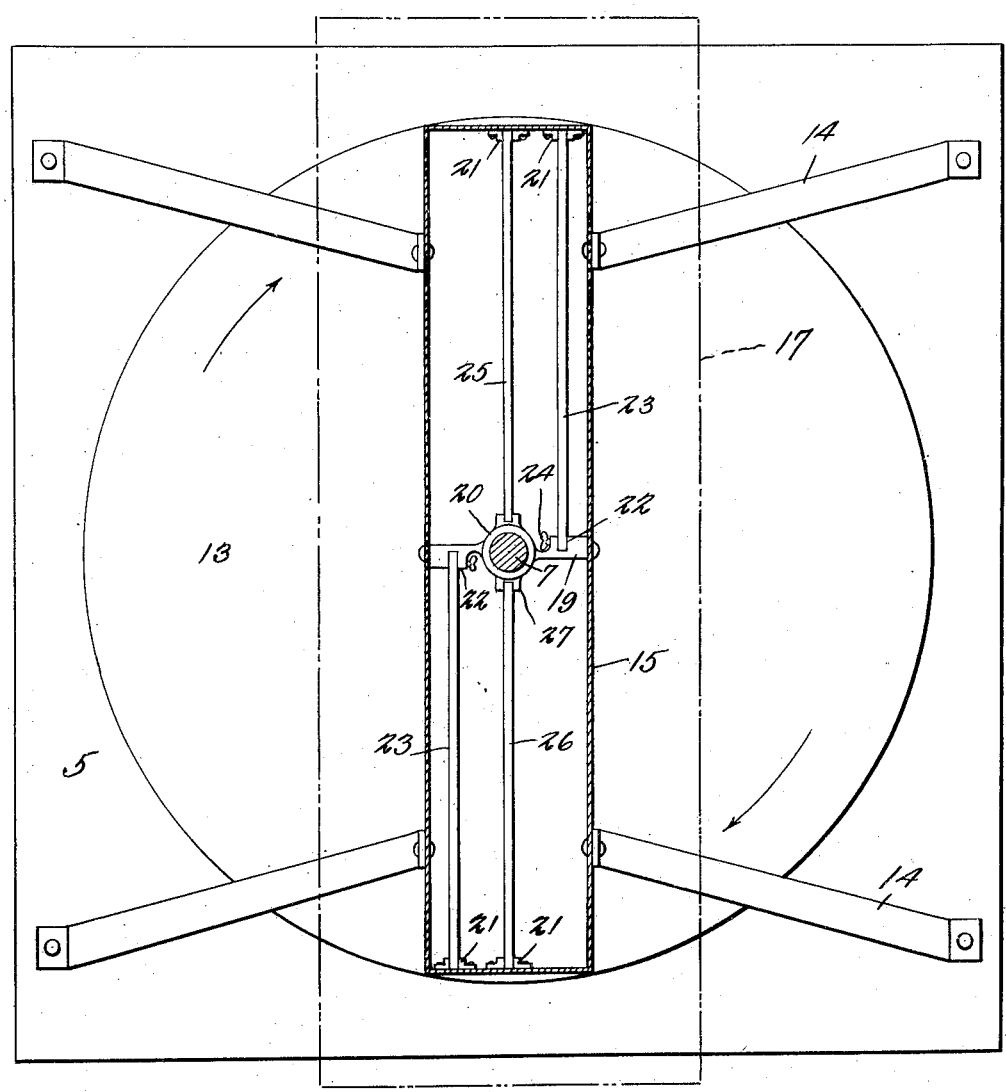

Figure 1 illustrates a sectional view of a fly trap embodying the invention; and Fig. 2 illustrates a horizontal sectional view thereof on a line corresponding with the line 2—2 of Fig. 1.

In these drawings 5 denotes a motor casing having a bearing 6 on its base in which a vertically disposed shaft 7 is rotatably mounted, the said motor casing also having a bearing 8 for the said shaft.

Any suitable motor 9 may be employed having a driven shaft 10 with a pinion 11 meshing with a gear wheel 12 on the shaft 7 so that the shaft is rotated under the influence of the motor and preferably the motion should be slow.

A disk 13 is secured on the shaft to rotate just clear of the top of the motor casing and is intended to be coated with some insect attracting fluid or bait.

Braces or supports 14 are anchored on the motor casing and they support a rectangular housing 15 which housing has a flange 16 constituting the bottom of the trap 17, which trap is preferably of wire or some such material as will admit light but prevent the escape of flies, and the said trap has its end anchored on the flange 16 in any apropriate manner so that it can be removed. The flange is shaped to form a bowl which may contain insect destroying fluids or poison and it may be of any desired size to meet the requirements.

The housing 15 has a flue shaped extension 18 reaching to a point near the top of the trap 17 so that flies entering the housing 15 will escape at the top of the extension and enter the trap.

The housing is supplied with means for dislodging the flies from the disk 13 and causing them to be attracted to the extension so that they will escape into the trap and to that end the housing has a transversely disposed partition 19 with a sleeve 20 through which the shaft 7 extends and the said housing has seats 21 at each end in which the ends of glass plates are seated. The partition 19 also has recesses 22 in which the ends of two of the glass plates 23 are secured by fastenings such as set screws 24, whereas the glass plates 25 and 26 have their ends in two of the seats 21, but their inner ends are applied to seats such as 27 on the sleeve 20 and the said plates 25 and 26 have their edges projecting below the housing in close proximity to the surface of the disk so that when flies are carried under the housing by the disk, they come in contact with the partition 25 or 26 and are dislodged and caused to enter the housing. The housing has a cross bar A with an aperture therein forming a bearing for the upper end of the shaft.

It will be seen that the flies will not encounter the depending plates until they are well under the housing and as light will enter from above, they will naturally ascend through the housing and the extension to the trap.

The details for securing the extension to the housing have not been shown and other details are perhaps omitted but enough of the construction of the device and the details of securing the parts together is supplied to enable one skilled in the art to produce the device and further detailed description or illustration is believed unnecessary.

The disk rotates and any flies that may be lodged thereon will be carried under the housing and when the flies come in contact with the depending plates, they will be disturbed or dislodged and in their attempt to escape, the flies will ascend the housing and enter the flue-shaped extension and find an exit from the extension into the trap.

I claim—

In a fly trap, a motor casing, a shaft vertically mounted therein, a motor in the casing, means for communicating the motion of the motor to the shaft, a disk mounted on the shaft above the casing, a housing suspended above the disk, a partition extending transversely of the housing and having a sleeve to receive the shaft, partitions extending from the partition to the ends of the housing, certain of said partitions having their edges depending below the housing in proximity to the disk, a trap above the housing, and an extension of the sleeve extending into the said trap.

FREDERICK L. SANDOZ.